United States Patent
Oshima et al.

(10) Patent No.: US 9,189,177 B2
(45) Date of Patent: Nov. 17, 2015

(54) CONTENT OUTPUTTING METHOD, CONTENT SERVER AND MEDIATION SERVER

(75) Inventors: Yasuhiro Oshima, Matsumoto (JP); Yasuhiro Furuta, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 1056 days.

(21) Appl. No.: 13/283,494

(22) Filed: Oct. 27, 2011

(65) Prior Publication Data

US 2012/0110065 A1    May 3, 2012

(30) Foreign Application Priority Data

Oct. 29, 2010 (JP) ................. 2010-242973

(51) Int. Cl.
G06F 15/16  (2006.01)
G06F 3/12   (2006.01)
H04N 1/00   (2006.01)

(52) U.S. Cl.
CPC ............ G06F 3/1204 (2013.01); G06F 3/1228 (2013.01); G06F 3/1265 (2013.01); G06F 3/1287 (2013.01); G06F 3/1292 (2013.01); H04N 1/00222 (2013.01); H04N 1/00244 (2013.01); H04N 2201/0091 (2013.01); H04N 2201/3205 (2013.01); H04N 2201/3207 (2013.01)

(58) Field of Classification Search
CPC ....... G06F 3/12; G06F 3/1204; G06F 3/1292; G06F 3/1287; G06F 3/1228; G06F 3/1265; H04N 1/00244; H04N 1/00222; H04N 2201/3208; H04N 2201/3205; H04N 2201/0091

See application file for complete search history.

(56) References Cited

U.S. PATENT DOCUMENTS

| | | | |
|---|---|---|---|
| 7,011,462 B2 | 3/2006 | Hanaoka | |
| 7,644,119 B1 | 1/2010 | Anooshfar | |
| 2002/0198954 A1* | 12/2002 | Okamoto et al. | 709/213 |
| 2003/0016385 A1 | 1/2003 | Matsumoto et al. | |
| 2003/0084114 A1* | 5/2003 | Simpson et al. | 709/216 |
| 2003/0084178 A1* | 5/2003 | Simpson et al. | 709/231 |
| 2007/0050335 A1 | 3/2007 | Kashima et al. | |
| 2007/0230463 A1* | 10/2007 | Shima et al. | 370/389 |
| 2009/0288153 A1 | 11/2009 | Nakazawa | |
| 2010/0134818 A1 | 6/2010 | Minamizono et al. | |

FOREIGN PATENT DOCUMENTS

| | | |
|---|---|---|
| JP | 2003-008569 A | 1/2003 |
| JP | 2003-242105 A | 8/2003 |
| JP | 2003-271356 A | 9/2003 |
| JP | 2007-058782 A | 3/2007 |
| JP | 2009-278420 A | 11/2009 |
| JP | 2010-114946 A | 5/2010 |
| JP | 2010-157208 A | 7/2010 |

* cited by examiner

*Primary Examiner* — Krisna Lim
(74) *Attorney, Agent, or Firm* — Kilpatrick Townsend & Stockton LLP

(57) ABSTRACT

A content outputting system includes a client, a content server, a mediation server and an outputting apparatus. Upon reception of a request for outputting content data, the client transmits a request for outputting, which includes a storage location of the content, to the mediation server, so that the mediation server transmits a request for acquisition of the content data to the content server. The content server retrieves the content data from a storage section thereof, and transmits the retrieved content data to the mediation server. The mediation server creates output data on the basis of the received content data, and then, transmits the created output data to the outputting apparatus.

7 Claims, 12 Drawing Sheets

FIG. 2

PRINTER DATABASE 312

| PRINTER ID | PRINTER SERIAL NUMBER |
|---|---|
| 91864236 | SID1 |
| 00000002 | SID2 |
| 10003000 | SID3 |
| ⋮ | ⋮ |

FIG. 3

CLIENT DATABASE 314

| CLIENT ID | PRINTER NUMBER | PRINT NAME | PRINTER ID |
|---|---|---|---|
| mobile1 | #1 | MyPrinter1 | 91864236 |
| | #2 | MyPrinter2 | 00000002 |
| mobile2 | #1 | MyPrinterA | 10003000 |
| ⋮ | ⋮ | ⋮ | ⋮ |

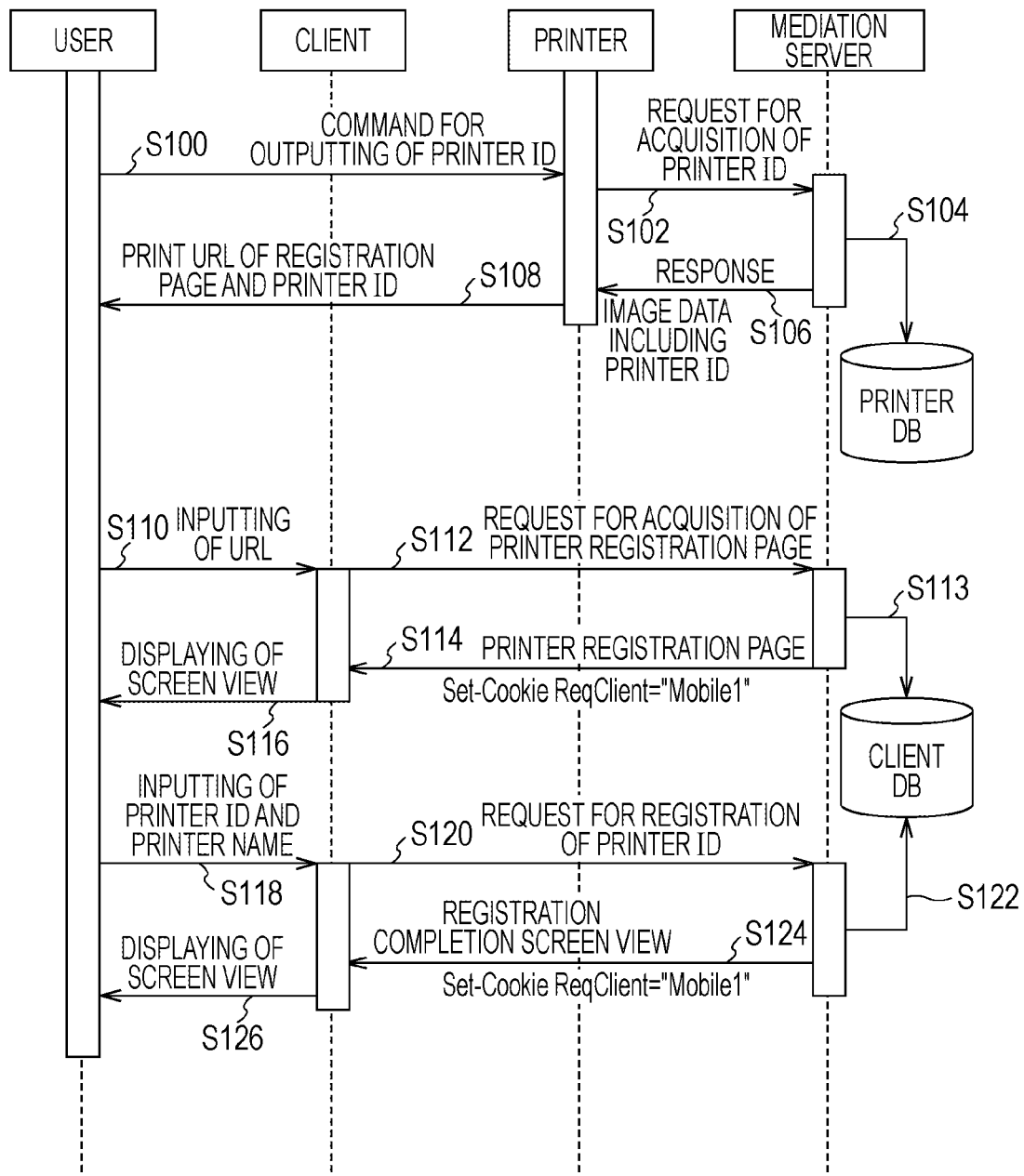

FIG. 7

When you want to register your printer as an output destination, please access the following URL and input Printer ID shown below.

http://xxx.xxx.xxx/print/addPrinter

Printer ID : 91864236

Direct access to the following address or scanning of the following two-dimensional bar code using mobile terminal could provide you with easy registration.

http://xxx.xxx.xxx/print
/addPrinter?printerID=91864236

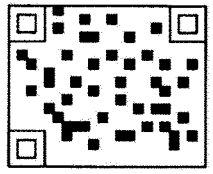

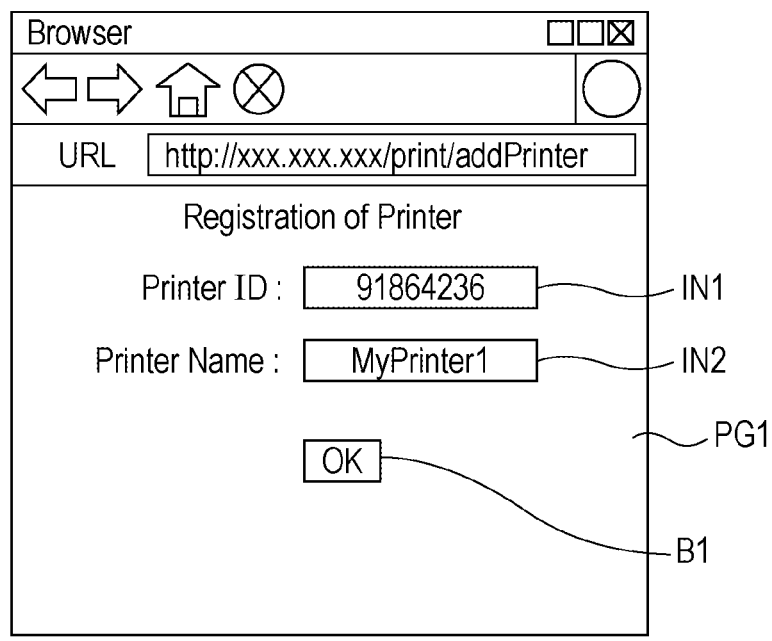

CONTENT OUTPUTTING METHOD, CONTENT SERVER AND MEDIATION SERVER

CROSS REFERENCES TO RELATED APPLICATIONS

The present invention contains subject matter related to Japanese Patent Application No. 2010-242973 filed in the Japanese Patent Office on Oct. 29, 2010, the entire contents of which are incorporated herein by reference.

BACKGROUND

1. Technical Field

The present invention relates to technologies for outputting contents via a network.

2. Related Art

Recently, technologies for outputting images from printers connected to a network such as the Internet have been proposed (refer to JP-A-2003-271356, JP-A-2003-8569 and JP-A-2010-157208). Further, technologies for inputting images from scanners connected to a network have been proposed (refer to JP-A-2010-114946 and JP-A-2009-278420).

In such existing technologies, however, when utilizing printers or scanners connected to a network, it is necessary to use application software (or driver software) which is dedicated to print processing or scan processing, and which is installed at the client sides; thereby causing the clients to be subjected to excessive loads.

SUMMARY

Accordingly, an advantage of some aspects of the invention is to provide a technology which enables reduction of loads on clients associated with outputting of contents via a network.

Some aspects of the invention, which will be described hereinafter, enable solution of at least one part of the foregoing problem.

According to a first aspect of the invention, a content outputting method is associated with four kinds of apparatuses which are connected to a network and communicate with one another via the network, the four kinds of apparatuses being a client, a content server including a storage section which stores blocks of content data at respective predetermined storage locations thereof, a mediation server and an outputting apparatus. Further, the content outputting method includes (a) transmitting, by the content server, two kinds of information to the client, one kind thereof being information indicating a storage location of a certain one of the blocks of content data, the other one thereof being information indicating an address of the mediation server; (b) transmitting, by the client, upon reception of a command for outputting the certain one of the blocks of content data, a first request to the mediation server on the basis of the received information indicating the address of the mediation server, the first request being a request for outputting the certain one of the blocks of content data, the request including the information indicating the storage location of the certain one of the blocks of content data; (c) transmitting, by the mediation server, upon reception of the first request from the client, a second request to the content server, the second request being a request for acquisition of the certain one of the blocks of content data; (d) transmitting, by the content server, upon reception of the second request from the mediation server, first data to the mediation server, the first data being the certain one of the blocks of content data, which has been retrieved from the storage section of the content server; (e) transmitting, by the mediation server, upon reception of the certain one of the blocks of content data from the content server, second data to the outputting apparatus, the second data being output data which has been created on the basis of the received certain one of the blocks of content data; and (f) outputting, by the outputting apparatus, upon reception of the output data from the mediation server, a content corresponding to the received output data.

According to such a content outputting method as described above, when the client has received a command for outputting content data, the mediation server acquires the content data from the content server, and transmits output data, which has been created on the basis of the acquired content data, to the outputting apparatus. Thus, it is possible to output contents regardless of software environments and hardware environments of the clients; thereby enabling reduction of loads on the clients.

According to the second aspect of the invention, a content outputting method of the first aspect, wherein the acquisition request transmission section of the client is configured to transmit the request by using an address which is a combination of an address of the mediation server and an address indicating a storage location of the content data.

Such a configuration of the mediation server as described above enables transmission of a request for outputting in the form of a HTTP based request message which is a standard in the Internet industry.

According to a third aspect of the invention, a content outputting method of the first or second aspect, wherein the acquisition request transmission section is configured to, in advance to transmission of the second request to the content server after having received the first request from the client, receive an outputting apparatus assignment with respect to outputting of the content data, from the client which is a sender of the first request, and the output data transmission section of the mediation server is configured to transmit the output data to the outputting apparatus having been assigned by the client.

Such a configuration of the mediation server as described above makes it possible for the client to output content data by using any outputting apparatus.

According to a fourth aspect of the invention, the content outputting method of the third aspect, wherein the mediation server further includes: a database configured to include data indicating a correspondence relation between a serial number, which is assigned to the outputting apparatus when the outputting apparatus is manufactured, and an outputting apparatus identifier, which is uniquely assigned to the outputting apparatus by the mediation server. The acquisition request transmission section of the mediation server is configured to receive an outputting apparatus assignment using the outputting apparatus identifier from the client which is a sender of the first request, and the output data transmission section of the mediation server is configured to specify the outputting apparatus, which is a transmission destination of the output data, in accordance with a serial number which corresponds to the outputting apparatus identifier having being used in the received assignment.

Such a configuration of the mediation server as described above enables any outputting apparatus to output content data stored in the content server without any disclosure of the serial numbers of the outputting apparatuses to the content server According to a fifth aspect of the invention, the content outputting method according to any one of the first to fourth aspects, wherein the acquisition request transmission section of the client is configured to transmit the acquisition request which includes an address of the content server in addition to a storage location of the content data, and the acquisition request transmission section of the mediation server is configured to, after having received the first request from the client, transmit the address of the content server to the client after having received the first request from the client.

Such a configuration of the mediation server as described above makes it possible for the client to receive an address of the content server again without any particular retention of the address thereof. Thus, it is possible for the client to properly display a page provided by the content server after transmission of a request for outputting.

As described above, the invention can be realized as each of a content server and a mediation server, as well as a content outputting method. Moreover, the invention can be also realized as a computer program. The computer program may be recorded in a recording medium readable from computers. Further, the computer program may be a computer program for the entire system, a computer program for the content server, or a computer program for the mediation server.

BRIEF DESCRIPTION OF THE DRAWINGS

The invention will be described with reference to the accompanying drawings, wherein like numbers reference like elements.

FIG. 2 is a diagram illustrating an example of a printer database according to an embodiment of the invention.

FIG. 3 is a diagram illustrating an example of a client database according to an embodiment of the invention.

FIG. 6 is a diagram illustrating a sequence of printer registration processing according to an embodiment of the invention.

FIG. 7 is a diagram illustrating an example in which a printer ID is printed on print paper, according to an embodiment of the invention.

FIG. 8 is a diagram illustrating an example of a screen view of a printer registration page, according to an embodiment of the invention.

DESCRIPTION OF EXEMPLARY EMBODIMENTS

Hereinafter, embodiments according to the invention will be described in the following order:
A. Configuration of Content Outputting System
B. Printer Registration Processing
C. Content Output Processing
D. Scan Processing
E. Modified Examples

A. CONFIGURATION OF CONTENT OUTPUTTING SYSTEM

Figure 1:
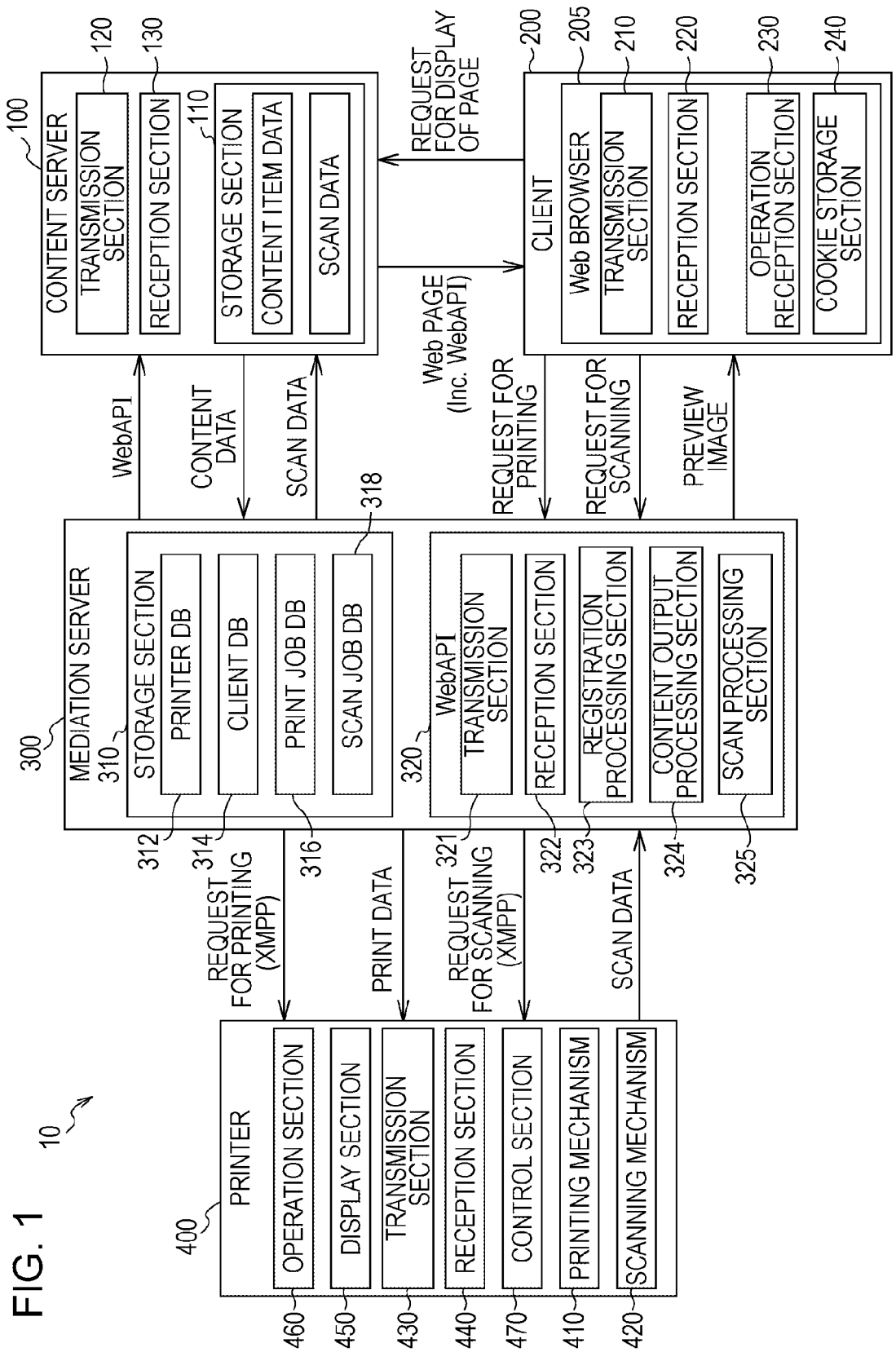
FIG. 1 is a diagram illustrating an outline of a content outputting system according to an embodiment of the invention.

Referring to FIG. 1 which is a diagram illustrating an outline of a configuration of a content outputting system according to an embodiment of the invention, a content outputting system 10 is configured to include a content server 100, a client 200, a mediation server 300, and a printer 400 having a scanning function, which are connected to one another via a network, such as the Internet. The content outputting system 10 according to this embodiment has a function of printing any content stored in the content server 100 from the printer 400 via the mediation server 300, in response to a command from the client 200. Further, the content outputting system 10 according to this embodiment has a function of transferring (uploading) images, which are read in by means of a scanning function of the printer 400, to the content server 100 via the mediation server 300, in response to a command from the client 200. That is, the content outputting system 10 has also a function as an image inputting system to which images are inputted from the printer 400 functioning as an image inputting apparatus. All these functions are available from a user interface provided by a Web browser 205 installed in the client 200.

The content server 100 is a computer provided with a CPU and a memory module, and functions as a Web server. The content server 100 includes a storage section 110, a transmission section 120, and a reception section 130. The storage section 110 stores various content data therein, such as various Web pages written in the HTML language, and image data corresponding to coupon tickets, maps and the like. Further, the storage section 110 stores therein scan data corresponding to images having been read in by means of the scanning function of the printer 400. The transmission section 120 transmits various request/response messages to the client 200 and the mediation server 300 in accordance with the HyperText Transfer Protocol (HTTP) standard. Further, the reception section 130 receives various request/response messages from the client 200 and the mediation server 300 in accordance with the HTTP standard.

The client 200 is a computer provided with a CPU and a memory module, and functions as a Web client. The client 200 can be configured as, for example, a network accessible device, such as a personal computer, a net book, a mobile phone, a portable music player, a game machine, and a television set. The client 200 includes the Web browser 205 installed therein, which functions as a Web client program. By causing the CPU to execute the Web browser 205, the client 200 realizes functions of a transmission section 210, a reception section 220, an operation reception section 230, and a cookie storage section 240, which are shown in FIG. 1. The transmission section 210 transmits various request/response messages to the content server 200 and the mediation server 300 in accordance with the HTTP standard. Further, the reception section 220 receives various request/response messages from the content server 200 and the mediation server 300 in accordance with the HTTP standard. The operation reception section 230 receives various users' operations using a graphical user interface (GUI) on a Web page received from the content server 100. The cookie storage section 240 has a function of storing therein cookie information issued by the content server 100 and the mediation server 300.

The mediation server 300 is a computer provided with a CPU and a memory module, and functions as a Web server. The mediation server 300 includes a storage section 310, which has a printer database 312, a client database 314, a print job database 316 and a scan job database 318. These databases will be hereinafter described in detail. The mediation server 300 has a Web API program (hereinafter, which will be called just "a Web API") 320 installed therein. Further, by causing the CPU to execute this Web API, the mediation server 300 performs functions of a transmission section 321, a reception section 322, a registration processing section 323, a content output processing section 324 and a scan processing section 325, which are shown in FIG. 1. The Web API is an application program interface which can provide Web pages of third parties with various functions via the Internet. In this embodiment, the printing function and the scanning function using the printer 400 are provided on the Web pages delivered from the content server 100. Specifically, a uniform resource locator (URL) of an execution file of the Web API is linked to various buttons (or anchor tags) disposed inside the Web pages delivered from the content server 100; thereby enabling provision of the printing function and the scanning function using the printer 400.

The transmission section 321 transmits various request/response messages to the content server 100, the client 200 and the printer 400 in accordance with the HTTP standard. In this embodiment, the transmission section 321 transmits part of commands in accordance with not the HTTP standard but the extensible messaging and presence protocol (XMPP) standard. Further, the reception section 322 receives various request/response messages from the content server 100, the client 200 and the printer 400 in accordance with the HTTP standard.

The registration processing section 323 is a program module which realizes printer registration processing described below, and has a function of registering the printer 400 utilized by a user of the client 200. Further, the content output processing section 324 is a program module which realizes content output processing described below, and has a function of printing content data stored in the content server 100 by using the printer 400 in response to a command from a user utilizing the client 200. Further, the scan processing section 325 is a program module which realizes scan processing described below, and has a function of scanning images by using the printer 400 in response to a command from a user utilizing the client 200, and uploading the scanned images to the content server 100.

The printer 400 is a multifunction type printer incorporating a scanner, and includes a printing mechanism 410, a scanning mechanism 420, a transmission section 430, a reception section 440, a display section 450, an operation section 460 and a control section 470.

The printing mechanism 410 is a mechanism which performs printing on print paper by driving a print head. Further, the scanning mechanism 420 is a mechanism which obtains image data by driving a CCD image sensor.

The transmission section 430 transmits various request/response messages to the mediation server 300 in accordance with the HTTP standard. Further, the reception section 440 receives various request/response messages from the mediation server 300 in accordance with the HTTP standard. In this embodiment, the reception section 400 has a function of receiving part of commands to the printer 400 in accordance with not the HTTP standard but the extensible messaging and presence protocol (XMPP) standard.

On the display section 450, operation statuses of the printer 400, images resulting from scanning and the like are displayed. Further, the operation section 460 is configured to include operation buttons for directing various operations to the printer 400, and the like. The control section 470 performs control of the printing mechanism 410, the scanning mechanism 420, the transmission section 430, the reception section 440, the display section 450, and the operation section 460.

Referring to FIG. 2, which is a diagram illustrating an example of the printer database 312 stored in the storage section 310 of the mediation server 300, in the printer database 312, a printer ID and a printer serial number are stored so as to correspond to each other. The printer ID is identification information which is uniquely assigned to a user's printer 400 by the mediation server 300 in printer registration processing described below. The printer serial number is a number which is specifically assigned to each of the printers 400 by a manufacturer thereof when the printers 400 are manufactured.

Referring to FIG. 3 which is a diagram illustrating an example of the client database 314 stored in the storage section 310 of the mediation server 300, in the client database 314, a client ID, a printer number, a printer name and the printer ID (refer to FIG. 2) are stored so as to correspond to one another. The client ID is identification information which is notified from the mediation server 300 to the client 200 as cookie information after the client 200 has accessed the mediation server 300. The client 200 stores this client ID into the cookie storage section 240 thereof by executing the functions of the Web browser 205. The printer number is a number which is individually assigned so as to correspond to the printer name and the printer ID. The printer name is a name of the printer 400, which is arbitrarily named by a user in the printer registration processing described below.

Figure 4:
FIG. 4 is a diagram illustrating an example of a print job database according to an embodiment of the invention.

Referring to FIG. 4 which is a diagram illustrating an example of the print job database 316 stored in the storage section 310 of the mediation server 300, in the print job database 316, a job ID which is specifically assigned to each of print jobs, the printer serial number (refer to FIG. 2) of the printer 400 in charge of printing, and a content URL which is a storage location of content data targeted for printing are stored so as to correspond to one another.

Figure 5:
FIG. 5 is a diagram illustrating an example of a scan job database according to an embodiment of the invention.

Referring to FIG. 5 which is a diagram illustrating an example of the scan job database 318 stored in the storage section 310 of the mediation server 300, in the scan job database 318, a job ID which is specifically assigned to each of scan jobs, image data which has been read in by the printer 400, a preview URL indicating a storage location of a preview image created from the read-in image data, a post URL indicating a storage location of a transmission destination of the read-in image data, and a return URL indicating a return destination in browsing of pages are stored so as to correspond to one another.

B. PRINTER REGISTRATION PROCESSING

FIG. 6 is a diagram illustrating a sequence of printer registration processing for registering the printer 400 into the mediation server 300 as a print destination. In this printer registration processing, first, a user gives the printer 400 a command for printing a printer ID (refer to FIGS. 2 and 3) by operating the operation section 460 (step S100). Upon reception of the command, the printer 400 transmits a request for acquisition of a printer ID to the mediation server 300 in the form of a HTTP based request message (step S102). The printer 400 incorporates a printer serial number, which is stored in the memory module included in the printer 400 itself, in the request message.

Upon reception of the request for acquisition of a printer ID from the printer 400, the mediation server 300 issues a printer ID. The printer ID may be any number if the number is not overlapped by the other printer IDs. Upon issue of the printer ID, the mediation server 300 records the issued printer ID into the printer database 312 (refer to FIG. 2) so as to correspond to the printer serial number incorporated in the request for acquisition (step S104).

After having recorded the issued printer ID into the printer database 312, the mediation server 300 creates an image representing the issued printer ID, and transmits the created image to the printer 400 in the form of a HTTP based response message (step S106). Upon reception of this response message, the printer 400 performs control so as to cause the printing mechanism 410 to print a predetermined message including the image (the printer ID) contained in the received response message (step S108). A reason why the printer ID is represented by an image is to prevent occurrence of a situation in which the printer ID is eavesdropped by third parties in the case where the printer ID is transmitted in the form of a HTTP based response message, because, usually, HTTP based messages are communicated in the form of clear text, and thus, can be easily eavesdropped by third parties.

FIG. 7 is a diagram illustrating an example of a print paper PA on which a printer ID is printed. On the print paper PA, as shown in FIG. 7, a URL of a page for registration of a printer (a printer registration page), which is a URL of the mediation server 300 in this case, and a printer ID having been received from the mediation server 300 are printed. Further, in this embodiment, a two-dimensional bar cord created by encoding the URL of the printer registration page and the printer ID is also printed.

Such a printed two-dimensional bar code allows the client 200 provided with a camera to analyze the two-dimensional bar code, and enables users to easily access the mediation server 300. In addition, the printer ID and the URL of the mediation server 300 are printed on the print paper PA in this embodiment, but may be displayed on the display section 450.

Next, the user inputs the URL of the printer registration page, i.e., the URL of the mediation server 300, which is printed on the print paper PA, such as shown in FIG. 7, to the Web browser 205 of the client 200 (step S110). Upon receipt of the inputted URL, the client 200 transmits a request for acquisition of a printer registration page to the mediation server 300 in the form of a HTTP based request message (step S112). Upon reception of the request for acquisition from the client 200, the mediation server 300 creates a client ID specific to the client 200 which is a sender of the request for acquisition, and records the created client ID into the client database 314 (step S113). Further, the mediation server 300 transmits a printer registration page, which is stored in the storage section 310 thereof in advance, to the client 200 in the form of a HTTP based response message (step S114). Concurrently therewith, the mediation server 300 transmits the created client ID to the client 200 as cookie information. Upon reception of the printer registration page and the cookie information from the mediation server 300, the client 200 displays the printer registration page on the Web browser 205 (step S116), and further, stores the cookie information into the cookie storage section 240.

Referring to FIG. 8 which is a diagram illustrating an example of a printer registration page displayed on the Web browser 205, an input field IN1 for inputting a printer ID, an input field IN2 for inputting a printer name and an OK button B1 are provided on the printer registration page PG1.

Upon display of the printer registration page PG1 on the Web browser 205, by using the printer registration page PG1, the user inputs the printer ID having been printed on the print paper PA, and an arbitrary printer name, and then, pushes the OK button B1 (step S118). Upon push thereof, the client 200 transmits a request for registration of the input printer ID to the mediation server 300 in the form of a HTTP based request message (step S120). This request for registration includes the printer ID and the printer name which have been inputted by using the printer registration page PG1.

In addition, concurrently with the transmission of the request for registration, the client 200 also transmits the client ID having been stored in the cookie storage section 240 to the mediation server 300 as cookie information.

Upon reception of the request for registration of the printer ID and the cookie information, first, the mediation server 300 determines whether the client ID included in the received cookie information corresponds to the client ID which has been already recorded in the client database 314, or not. In the case where no cookie information has been received, or certain cookie information which does not correspond to any cookie information (i.e., any client IDS) recorded in the client database 314 has been received, the mediation server 300 determines that an error has occurred, and a Web page representing that the registration of the printer 400 has failed is sent back to the client 200. In contrast, in the case where the client ID included in the received cookie information corresponds to the client ID which has been already recorded in the client database 314, the mediation server 300 records the printer ID and the printer name, which have been received from the client 200, into the client database 314 so as to cause the printer ID and the printer name having been received to correspond to the client ID which has been already recorded in the client database 314 (step S122). Further, the mediation server 300 sends back a Web page representing that the registration of the printer 400 has been successfully completed to the client 200 (step S124). Concurrently therewith, the mediation server 300 transmits the client ID to the client 200 again as cookie information. Upon reception thereof, the client 200 displays the received Web page, and further, stores the received cookie information into the cookie storage section 240 (step S126).

According to the above-described printer registration processing, the printer database 312 and the client database 314, such as shown in FIG. 2, are created inside the mediation server 300. As a result, the printer 400 a user has registered by using the printer registration page PG1 is now available in content output processing and scan processing described below.

C. CONTENT OUTPUT PROCESSING

Figure 9:
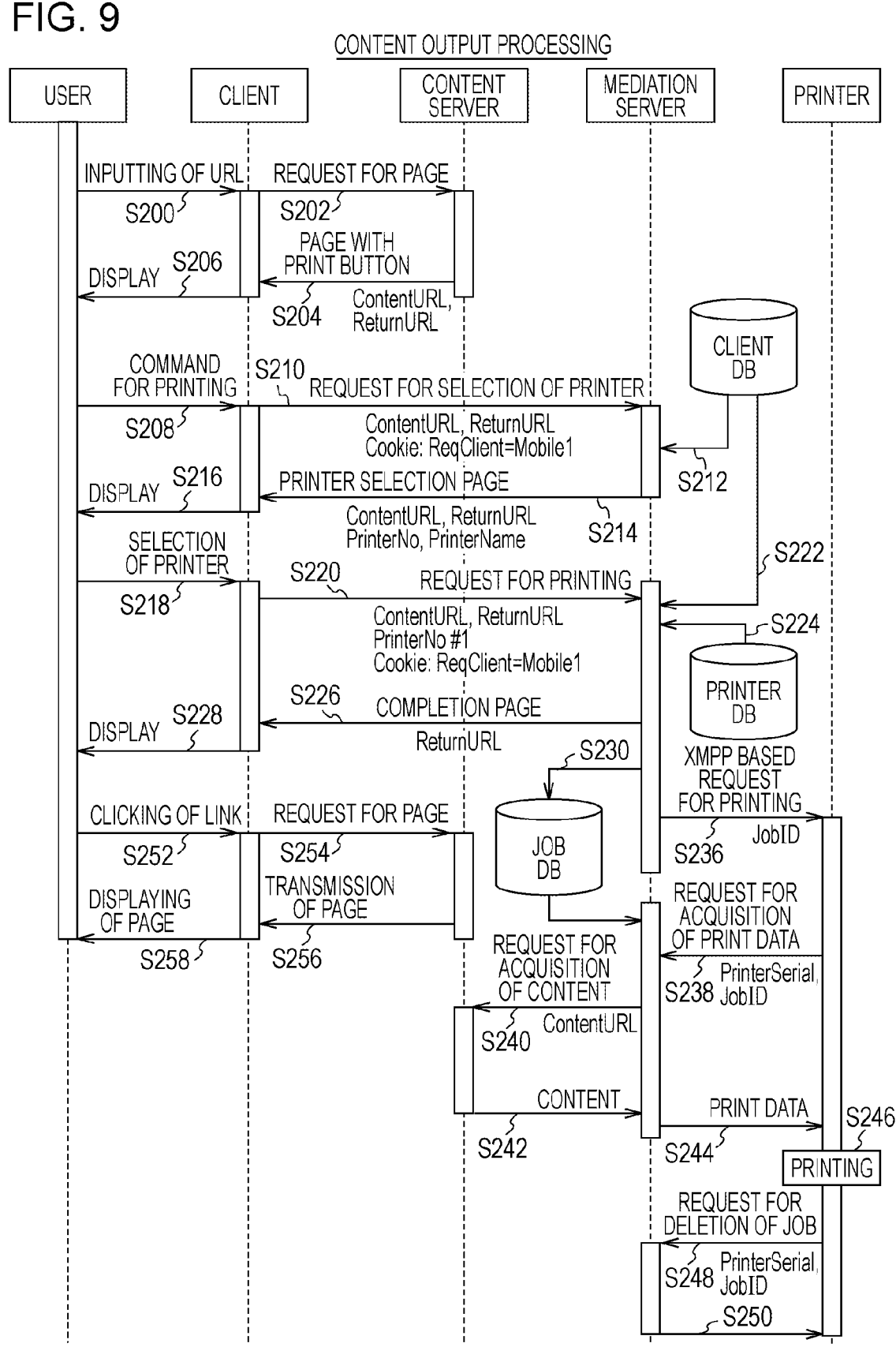
FIG. 9 is a diagram illustrating a sequence of content output processing according to an embodiment of the invention.

Referring to FIG. 9 which is a diagram illustrating a sequence of content output processing for outputting content, which is stored in the content server 100, from the printer 400, first, a user inputs a URL of a Web page, which is stored in the content server 100, by operating the Web browser 205 of the client 200 (step S200). Upon receipt of the input, the client 200 transmits a request for browsing the Web page to the content server 100 in the form of a HTTP based request message (step S202). Upon reception of the request for browsing, the content server 100 transmits the requested Web page with a print button, which is recorded in the storage section 110 thereof, to the client 200 in the form of a HTTP based response message (step S204). The print button provided inside the Web page is linked to the URL of the mediation server 300, a URL indicating a location of a print content recorded in the content server 100, and a return URL indicating a URL of a Web site to be displayed after completion of the content output processing (i.e., a URL of the content server 100 in this embodiment). Upon reception of the Web page from the content server 100, the client 200 displays the received Web page on the Web browser 205 (step S206).

Figure 10:
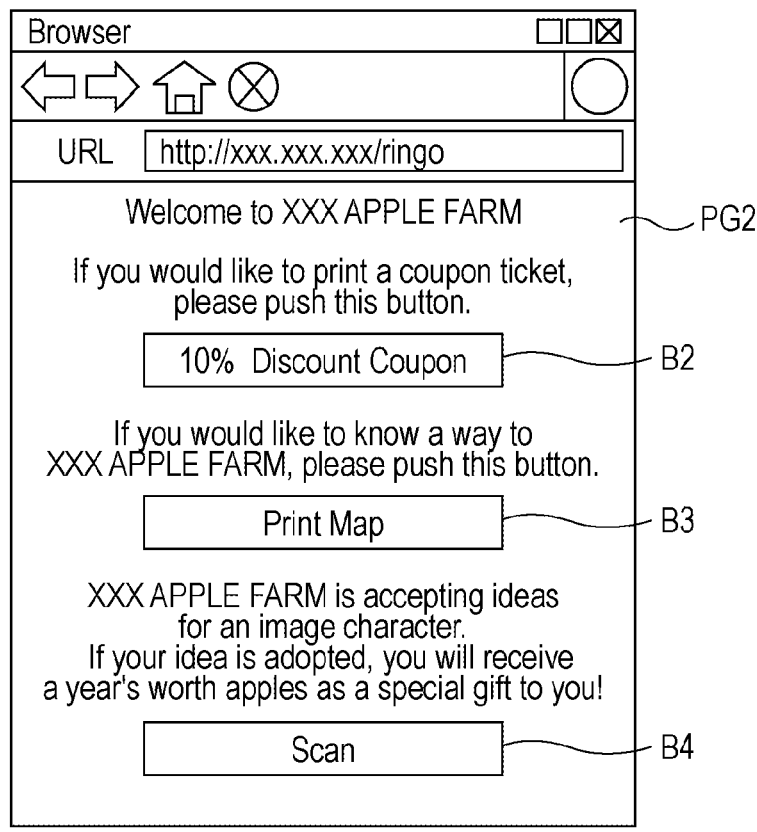
FIG. 10 is a diagram illustrating an example of a screen view of a Web page provided by a content server, according to an embodiment of the invention.

Referring to FIG. 10 which is a diagram illustrating an example in which a Web page recorded in the content server 100 is displayed on the Web browser 205 of the client 200, this Web page PG2 provides three print buttons; a first one being a print button B2 for printing a coupon ticket, a second one being a print button B3 for printing a map, a third one being a scan button B4 for scanning and uploading an image. A URL (1) shown below, which includes a URL indicating a storage location of image data corresponding to the coupon ticket as a memory location of the print content, is linked to the print button B2. Moreover, a URL, which includes a URL indicating a storage location of image data corresponding to the map as a memory location of the print content, is linked to the print button B3. The scan button B4 will be hereinafter described in detail.

"http://(URL of the mediation server 300)/print?contentURL=http://xxx.xxx.xxx/ringo/coupon.jpg?returnURL=http://xxx.xxx.xxx/" ... (1)

Upon display of the Web page PG2 of the content server 100 on the Web browser 205, the user issues a print command by pushing one of the print buttons, which corresponds to a desired print content (step S208). Upon receipt of the print command, the client 200 transmits a request for selection of one of the printers 400, which serves as a printer having a role of printing the print content (i.e., a request for selection of a printer), as well as the cookie information, which has been stored in the cookie storage section 240 of the client 200 in the printer registration processing, to the mediation server 300 (step S210). In this case, for example, upon push of the print button B2, the client 200 transmits the request for selection of a printer to the above-described URL (1).

As described above, in this example, when the print button B2 has been pushed, a request for selection of a printer is transmitted to the URL (1), which is a URL obtained by combining a URL of the mediation server 300, a content URL (here, "http://xxx.xxx.xxx/ringo/coupon.jpg") and a return URL (here, "http://xxx.xxx.xxx/") by using an identifier "?". In addition, the "print" included in the URL (1) is a file name of a program module which realizes the function of the content output processing section 324.

Upon reception of the request for selection of a printer and the cookie information from the client 200, the mediation server 300 accesses the client database 314, thereby, acquires a printer name and a printer number which correspond to the client ID contained in the cookie information (step S212), and, creates a Web page for selection of a printer (i.e., a printer selection page) on the basis of the printer name and the printer number having been acquired. Further, the mediation server 300 transmits the created printer selection page to the client 200 in the form of a HTTP based response message (step S214). Upon reception of the printer selection page, the client 200 displays the printer selection page on the Web browser 205 (step S216).

Figure 11:
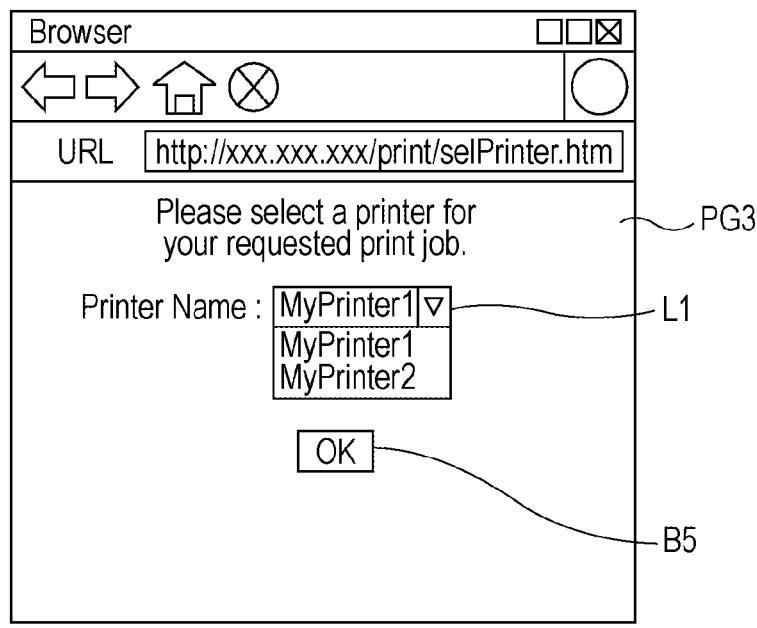
FIG. 11 is a diagram illustrating an example of a screen view of a printer selection page, according to an embodiment of the invention.

Referring to FIG. 11 which is a diagram illustrating an example of a printer selection page, a printer selection page PG3 provides a list L1 of printers which a user has registered by executing the printer registration processing, and an OK button B5. The list L1 is created by specifying a client ID on the basis of the cookie information having been received from the client 200, and listing all printers included in the client database 314, which are caused to correspond to the specified client ID. Each of the printer names included in this list L1 is caused to correspond to a printer number. Moreover, the OK button B5 is caused to correspond to the URL of the mediation server 300, and the content URL and the return URL which are included in the printer selection request having been received from the client 200.

When the printer selection page PG3 has been displayed on the Web browser 205, the user selects a printer, which serves as a printer having a role of outputting the print content, from among the printers included in the list L1, and then, pushes the OK button B5 (step S218). Upon receipt of the push of the OK button B5, the client 200 transmits a request for printing and cookie information to the mediation server 300 in the form of a HTTP based request message (step S220). In this case, the client 200 transmits the request for printing to a URL (2) shown below. This URL (2) includes the URL of the mediation server 300, the content URL, the return URL, and the printer number of the printer the user has selected on the printer selection page PG3.

"http://(URL of the mediation server 300)/print?contentURL=http://xxx.xxx.xxx/ringo/coupon.jpg?returnURL=http://xxx.xxx.xxx/?printerNo=#1" ... (2)

Upon reception of the request for printing and the cookie information from the client 200, the mediation server 300 accesses the client database 314, and thereby, specifies a printer ID corresponding to the printer number included in the request for printing, and a printer ID corresponding to the client ID included in the cookie information (step S222). Furthermore, the mediation server 300 refers to the printer database 312, and thereby, specifies a printer serial number corresponding to the printer ID having been specified in step S222 (step S224).

After the printer serial number has been specified in such a manner as described above, the mediation server 300 and the client 200 execute corresponding processes which are different from each other. First, processes performed by the client 200 will be described. After having specified the printer serial number, the mediation server 300 transmits a printing-request-reception completion page, in which a link to the return URL included in the request for printing having been received from the client 200 is described, to the client 200 (step S226). Upon reception of the printing-request-reception completion page, the client 200 displays the printing-request-reception completion page on the Web browser 205 (step S228).

Figure 12:
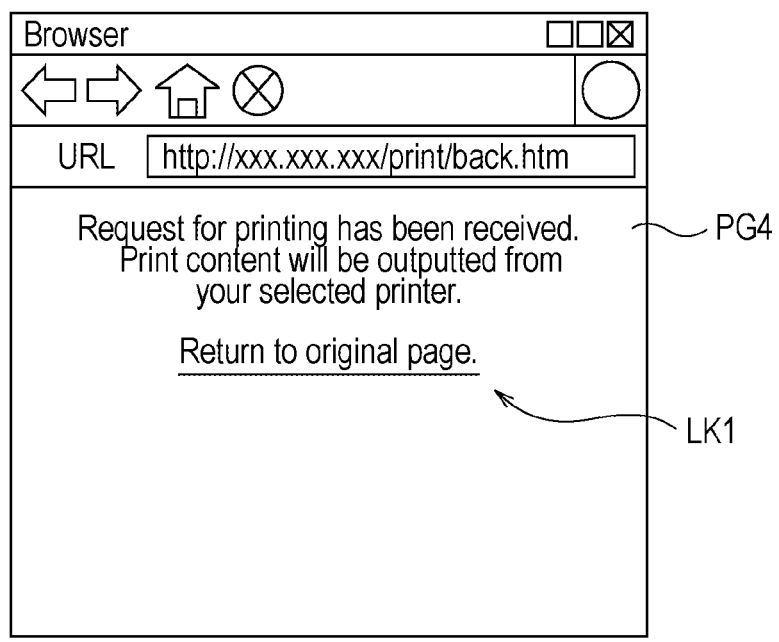
FIG. 12 is a diagram illustrating an example of a screen view of a printing-request-reception completion page, according to an embodiment of the invention.

Referring to FIG. 12 which is a diagram illustrating an example of a printing-request-reception completion page PG4 which is displayed on the Web browser 205 of the client 200, the printing-request-reception completion page PG4 includes a message, which notifies that the request for printing has been received, and a link LK1 to the return URL.

When a user has clicked the link LK1 included in the printing-request-reception completion page PG4 shown in FIG. 12 (step S252), the client 200 transmits a request for display of a page to the return URL, which is the link destination of the link LK1, and which is the URL of the content server 100 in this embodiment, in the form of a HTTP based request message (step S254). Upon reception of the request for display of a page, the content server 100 sends back the Web page PG2 (refer to FIG. 10) stored in the storage section 110 (step S256). Upon reception of the Web page PG2, the client 200 displays the Web page PG2 on the Web browser 205 thereof (step S258). In addition, the printing-request-reception completion page PG4 may include a tag or a script for redirecting a displaying page to the return URL, even though any explicit direction is not made by a user. Such a way as described above enables switching of a display screen to the Web page PG2 of the content server 100 without any particular operation by a user.

Next, processes performed by the mediation server 300 after the specification of the printer serial number will be described. After the specification of the printer serial number, the mediation server 300 assigns a unique job ID to the specified printer serial number and the content URL included in the request for printing having been received in step S220, and registers the job ID, the printer serial number and the content URL into the print job database 316 (refer to FIG. 4) (step S230). Further, the mediation server 300 transmits a request for printing, which includes the job ID, to the printer 400 corresponding to the printer serial number having been specified in step S224 described above (step S236) on the basis of the XMPP standard. The XMPP standard is a communication standard which was standardized as RFCs 3920 and 3921 by the internet engineering task force (IETF), and which has been mainly utilized in instant messengers. This XMPP standard enables real-time transmission of any message in the XML format to other apparatuses, and thus, enables execution of communication control which needs a response rate higher than that of the HTTP standard in which a request and its response are required to form a pair. In addition, from the mediation server 300 to the printer 400, the request for printing is transmitted in accordance with the XMPP standard, but may be transmitted in accordance with the HTTP standard.

When the printer 400 has received a request for printing in the form of an XMPP based request message, a destination of the request being its own printer serial number, the printer 400 transmits a request for acquisition of print data, the request having a job ID included in the request for printing and its own printer serial number, to the mediation server 300 which is a sender of the request for printing, in the form of a HTTP based request message (step S238). Upon reception of the request for acquisition of print data from the printer 400, the mediation server 300 specifies a content URL, which corresponds to the job ID and the printer serial number included in the received request for printing, from the print job database 316. Further, the mediation server 300 transmits a request for acquisition of a print content to the specified content URL in the form of a HTTP based request message (step S240).

Upon reception of the request for acquisition of a print content from the mediation server 300, the content server 100 transmits a print content, which is stored at a location indicated by the content URL, to the mediation server 300 in the form of a HTTP based response message (step S242). Upon reception of the print content from the content server 100, the mediation server 300 converts the received print content to print data having a data format which can be processed by the printer 400 (for example, the JPEG data format), and further, transmits the print data to the printer 400 in the form of a HTTP based response message (step S244). Upon reception of the print data from the mediation server 300, the printer 400 performs control so as to cause the printing mechanism 410 to perform printing in accordance with the print data (step S246). Upon completion of the printing, the printer 400 transmits a request for deletion of a job, which includes the job ID and its own printer serial number, to the mediation server 300 in the form of a HTTP based response message (step S248). Upon reception of the request for deletion of a job, the mediation server 300 deletes a job corresponding to the job ID and the printer serial number included in the request for deletion of a job. Further, the mediation server 300 notifies the printer 400 of the deletion of the job in the form of a HTTP based response message (step S250).

According to the above-described content output processing, it is possible for an administrator of the content server 100 to output any content stored in the content server 100 by using the printer 400 regardless of a hardware environment and a software environment of the client 200 merely by providing the Web page PG2 (refer to FIG. 10), which is administrated by the administrator, with user interfaces (the print buttons B2 and B3) having respective links to the mediation server 300. Therefore, the client 200 needs neither any printer connected thereto nor any printer driver installed therein, thereby enabling reduction of loads on the client 200. As a result, any device capable of browsing Web pages can be applied as the client 200. Therefore, not only a personal computer, but also various electronics devices, such as a net book, a mobile terminal, a portable music player, a game machine, a television set, a video player, and a video recorder, can be applied as the client 200. Moreover, in this embodiment, it is possible for users to utilize the printing function of the printer 400 merely by operating user interfaces on the Web browser 205. Therefore, it is unnecessary for users to additionally execute application software and driver software needed to utilize the printing function. Thus, it is possible for users to utilize printers merely by performing extremely easy operations.

Moreover, according to the above-described content output processing, the mediation server 300 performs control of the printer 400, and makes conversion of data formats of respective contents. Therefore, it is unnecessary for content providers to provide the content server 100 with any mechanism for controlling the printer 400. Thus, it is possible for the content providers to easily publish various print contents on their own Web pages without any consideration of printing environments which are different for respective users.

Furthermore, according to the above-described content output processing, although the printer serial numbers specific to the respective printers 400 are registered in the mediation server 300, the printer serial numbers are not notified to the content server 100. Therefore, it is unnecessary to directly notify the existence of the printers 400 to the content providers which are third parties. Thus, it is possible to provide a system having superiority in security.

D. SCAN PROCESSING

Figure 13:
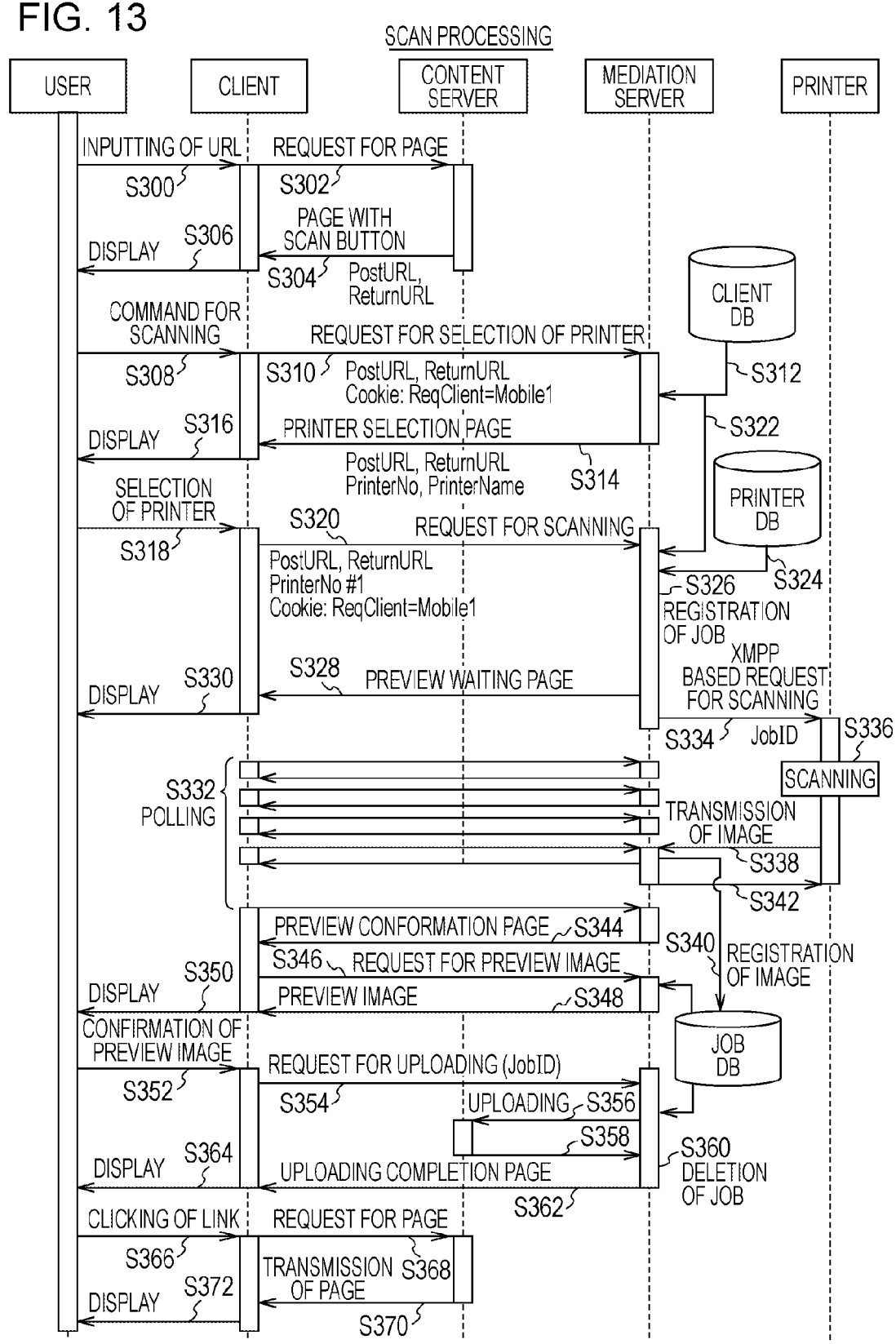
FIG. 13 is a diagram illustrating a sequence of scan processing according to an embodiment of the invention.

Referring to FIG. 13 which is a diagram illustrating a sequence of scan processing for uploading images, which are obtained by scanning performed by the printer 400, to the mediation server 300, first, a user inputs a URL of the Web page PG2, which is stored in the content server 100, by operating the Web browser 205 of the client 200 (step S300). Upon reception of the input, the client 200 transmits a request for browsing of the Web page PG2 to the content server 100 in the form of a HTTP based request message (step S302). Upon reception of the request for browsing, the content server 100 transmits the Web page PG2 having a scan button, the Web page PG2 being stored in the storage section 110 of the content server 100, to the client 200 in the form of a HTTP based response message (step S304). To this scan button included in the Web page 2, the URL of the mediation server 300, a URL indicating a transmission destination of images obtained by performing scanning, and a return URL indicating a URL of a Web site to be displayed after completion of the scan processing (in this embodiment, the return URL being a URL of the content server 100), are linked. Specifically, a URL (3) shown below, which is obtained by combining the URL of the mediation server 300, a URL indicating a transmission destination of images obtained by performing scanning, and a URL of a Web site to be displayed after completion of the scan processing, is linked to the scan button. Upon reception of the Web page PG2 from the content server 100, the client 200 displays the received Web page PG2 on the Web browser 205 (step S306). FIG. 10 shows an example in which a scan button B4 is provided in order to upload an image of an image character created by a user.

"http://(URL of the mediation server 300)/scan?postURL=http://xxx.xxx.xxx/storage?returnURL=http://xxx.xxx.xxx/"  ... (3)

Upon display of the Web page PG2 of the content server 100 on the Web browser 205, the user issues a scan command by pushing the scan button B4 (step S308). Upon reception of the command, the client 200 transmits a request for selection of one of the printers 400, which serves as a printer having a role of scanning images (i.e., a request for selection of a printer), and the cookie information, which has been stored into the cookie storage section 240 of the client 200 in the above-described printer registration processing (step S310). In this case, for example, the client 200 transmits the request for selection of a printer to the URL (3).

As described above, in this example, when the scan button B4 has been pushed, a request for selection of a printer is transmitted to the URL (3), which is a URL obtained by combining a URL of the mediation server 300, a post URL (here, "http://xxx.xxx.xxx/storage"), and a return URL (here, "http://xxx.xxx.xxx/") by using an identifier "?". In addition, the "scan" included in the URL (3) is a file name of a program module which realizes the function of the scan processing section 325.

Upon reception of the request for selection of a printer and the cookie information from the client 200, the mediation server 300 refers to the client database 314, thereby, acquires a printer name and a printer number which correspond to the client ID contained in the cookie information, and creates a Web page for selection of a printer (i.e., a printer selection page) on the basis of the printer name and the printer number having been acquired (step S312). Further, the mediation server 300 transmits the created printer selection page to the client 200 in the form of a HTTP based response message (step S314). Upon reception of the printer selection page, the client 200 displays the printer selection page on the Web browser 205 (step S316).

Figure 14:
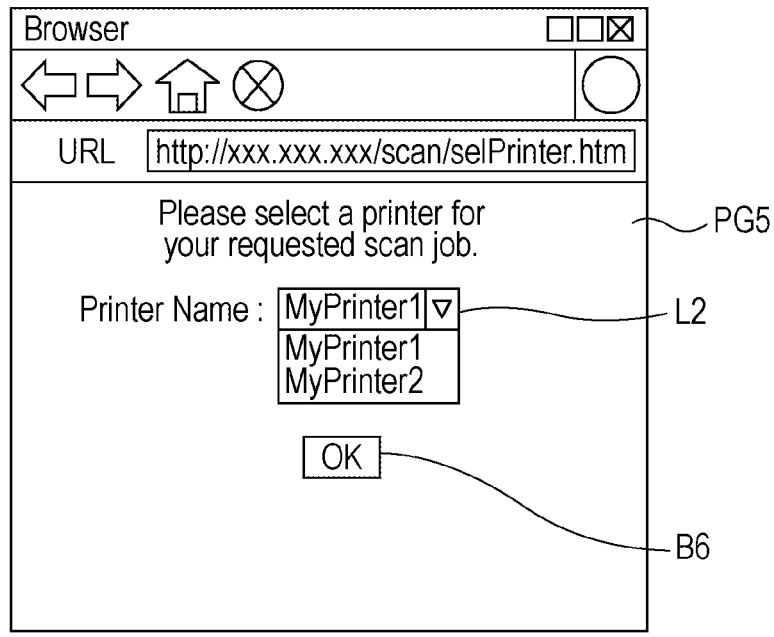
FIG. 14 is a diagram illustrating an example of a screen view of a printer selection page, according to an embodiment of the invention.

Referring to FIG. 14 which is a diagram illustrating an example of a printer selection page, in a printer selection page PG5, which is mostly the same as the printer selection page PG3, each of the printer names included in a list L2 is caused to correspond to a printer number. Moreover, an OK button B6 is caused to correspond to the URL of the mediation server 300, the post URL contained in the printer selection request having been received from the client 200, and the return URL.

When the printer selection page PG5 has been displayed on the Web browser 205, a user selects a printer, which serves as a printer having a role of scanning, from among the printers included in the list L2, and then, pushes the OK button BE (step S318). Upon receipt of the push of the OK button B6, the client 200 transmits a request for scanning and cookie information to the mediation server 300 in the form of a HTTP based request message (step S320). In this case, the client 200 transmits the request for scanning to a URL (4) shown below. This URL (4) includes the URL of the mediation server 300, the post URL, the return URL and the printer number of the printer having been selected by the user on the printer selection page PG5.

"http://(URL of the mediation server 300)/scan?postURL=http://xxx.xxx.xxx/storage?returnURL=http://xxx.xxx.xxx/?printerNo=#1"  ... (4)

Upon reception of the request for scanning and the cookie information from the client 200, the mediation server 300 refers to the client database 314, and thereby, specifies a printer ID corresponding to the printer number included in the request for scanning and the client ID included in the cookie information (step S322). Furthermore, the mediation server 300 refers to the printer database 312, and thereby, specifies a printer serial number corresponding to the printer ID having been specified in step S322 (step S324). After the specification of the printer serial number, the mediation server 300 assigns a unique job ID to the printer serial number and the post URL included in the request for scanning having been received in step S320, and registers the job ID, the printer serial number and the post URL into the scan database 318 (refer to FIG. 5) (step S326).

When a scan job has been registered into the scan job database 318 in such a manner as described above, the mediation server 300 and the client 200 execute corresponding series of processes which are different from each other. First, a series of processes performed by the client 200 will be described below. Upon completion of the registration of the scan job, the mediation server 300 transmits a Web page for waiting for reception of a preview image (i.e., a preview waiting page) together with the job ID to the client 200 in the form of a HTTP based response message (step S328). Upon reception of the preview waiting page, the client 200 displays the preview waiting page on the Web browser 205 (step S328).

Figure 15:
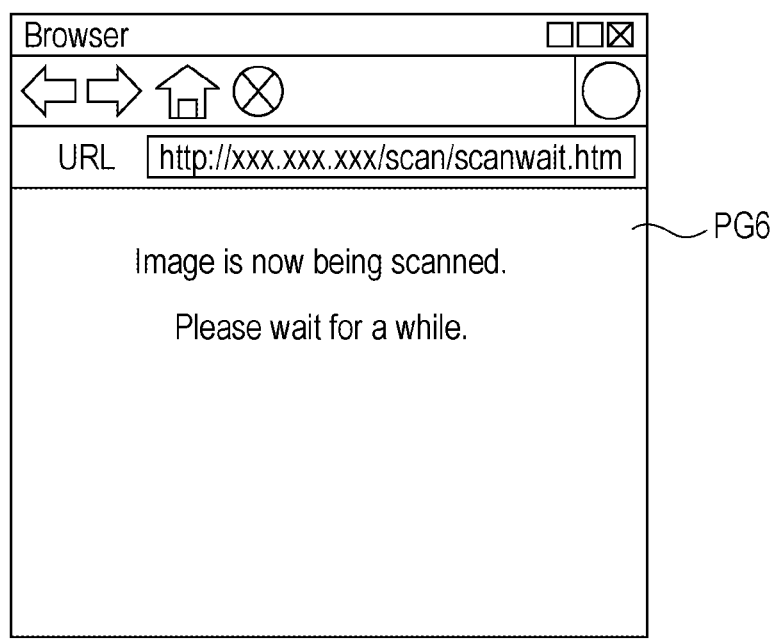
FIG. 15 is a diagram illustrating an example of a screen view of a preview waiting page, according to an embodiment of the invention.

Referring to FIG. 15 which is a diagram illustrating an example of a preview waiting page, for example, a message: "Image is now being scanned. Please wait for a while." is indicated. This preview waiting page PG6 includes a tag or a script for automatically reloading the display screen at intervals of several seconds, so that the client 200 performs periodic inquiries (polling) with respect to whether a preview image has been completely created, or not (step S330).

When reloading the preview waiting page PG6, the job ID is notified to the mediation server 300 in the form of a HTTP based request message. The mediation server 300 repeats transmission of the preview waiting page PG6 until images corresponding to the job ID have been completely recorded into the scan job database 318.

Next, a series of processes performed by the mediation server 300 after completion of the registration of the scan job will be described below. During a period of time while the polling from the client 200 is performed, the mediation server 300, first, transmits a request for scanning, which includes the job ID, to the printer 400 corresponding to the printer serial number having been specified in step S324 described above (step S334). In addition, in this embodiment, when the request for scanning is transmitted from the mediation server 300 to the printer 400, the XMPP standard is employed, but the HTTP standard can be also employed.

When the printer 400 has received a request for scanning whose destination is its own printer serial number, the printer 400 performs control so as to cause the scanning mechanism 420 to perform scanning (step S336). Further, the printer 400 transmits image data resulting from scanning to the mediation server 300 together with the job ID in the form of a HTTP based response message (step S338). Upon reception of the image data and the job ID from the printer 400, the mediation server 300 registers the image data into the scan job database 318 so as to correspond to the job ID (step S340). Further, concurrently therewith, the mediation server 300 creates a preview image by zooming out the received image, and stores the resultant preview image into the storage section 310. Further, the mediation server 300 registers a URL of a location, at which the preview image is stored, into the scan job database 318 as a preview URL. Upon completion of the registration of the image data and the preview URL into the scan job database 318, the mediation server 300 notifies the printer 400 of a successful reception of the image data in the form of a HTTP based response message (step S342).

When the mediation server 300 has registered the image data having been obtained by scanning and the preview URL into the scan job database 318 in such a manner as described above, in order to respond to the polling from the client 200 in step S332, the mediation server 300 transmits a preview confirmation page, which includes the job ID and the preview URL, to the client 200 in the form of a HTTP based response message (step S344). Upon reception of the preview confirmation page, the client 200 transmits a request for transmission of the preview image to the mediation server 300, the request including an indication of the preview URL included in the preview confirmation page (step S346). Upon reception of the request for transmission of the preview image, the mediation server 300 transmits the preview image, which is stored at a location indicated by the preview URL, to the client 200 (step S348). As a result of the processes described above, upon reception of the preview image, the client 200 disposes the preview image inside the preview confirmation page, and displays the preview image on the Web browser 205 (step S350).

Figure 16:
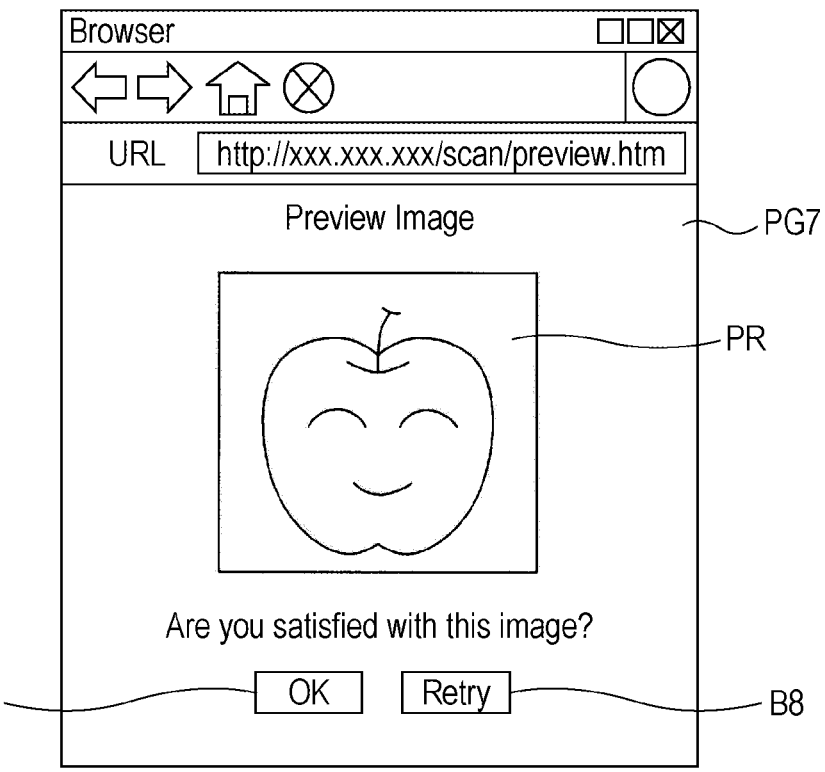
FIG. 16 is a diagram illustrating an example of a screen view of a preview confirmation page, according to an embodiment of the invention.

Referring to FIG. 16 which is a diagram illustrating an example of a preview confirmation page, a preview image PR, an OK button B7 and a retry button B8 are displayed on a preview confirmation page PG7. On this page, when the retry button B8 is pushed, a request similar to the request for scanning in step S320 is transmitted from the client 200 to the mediation server 300 in the form of a HTTP based request message. Therefore, the printer 400 performs scanning of a target image again. Meanwhile, when the OK button is pushed, the client 200 transmits a request for uploading of an image to the mediation server 300 in the form of a HTTP based request message (step S360). This request for uploading includes the Job ID.

Upon reception of the request for uploading from the client 200, the mediation server 300 acquires an image, which corresponds to the job ID included in the request for uploading, from the scan job database 318. Further, the mediation server 300 transmits the image having been acquired to the post URL registered in the scan job database 318 (in this embodiment, the post URL being the URL of the content server 100) in the form of a HTTP based request message (step S356). Upon reception of the image having been transmitted in such a manner as described, the content server 100 stores the images into the storage section thereof, and sends back a storage completion notification, which notifies that the image has been completely stored, to the mediation server 300 in the form of a HTTP based response message (step S358). Upon reception of the storage completion notification from the client 200, the mediation server 300 deletes a corresponding job from the scan job database 318 (step S360), and transmits an uploading completion page, which notifies that the uploading has been completed, to the client 200 in the form of a HTTP based response message (step S362). This uploading completion page includes the return URL registered in the scan job database 318. Upon reception of this uploading completion page, the client 200 displays this uploading completion page on the Web browser 205 (step S364).

Figure 17:
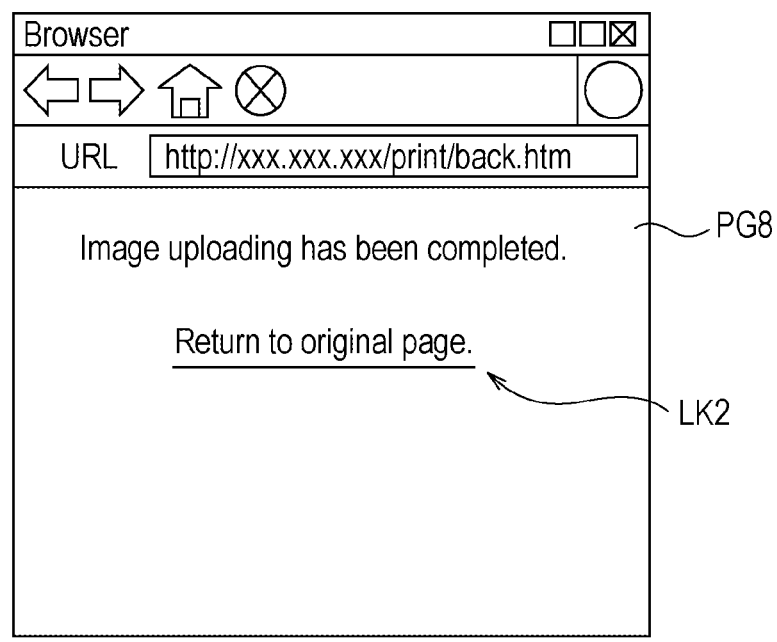
FIG. 17 is a diagram illustrating an example of a screen view of an uploading completion page, according to an embodiment of the invention.

Referring to FIG. 17 which is a diagram illustrating an example of an uploading completion page displayed on the Web browser 205 of the client 200, an uploading completion page PG8 includes a message notifying that the uploading has been completed, and a link LK2 denoting a link to a return URL. When a user clicks the link LK2 disposed inside the uploading completion page PG8 shown in FIG. 17 (step S366), the client 200 transmits a request for display of a page to the return URL to which the link LK2 is linked (in this embodiment, the return URL being the URL of the content server 100) in the form of a HTTP based request message (step S368). Upon reception of the request for display of a page, the content server 100 sends back the Web page PG2 (refer to FIG. 10) stored in the storage section 110 to the client 100 in the form of a HTTP based response message (step S370). Upon reception of the web page PG2, the client 200 displays the Web page PG2 on the Web browser 205 thereof (step S372). In addition, the uploading completion page PG8 may include a tag or a script for redirecting a displaying page to the return URL, even though any explicit direction is made by a user. Such a way described above enables switching of a display screen to the Web page PG2 of the content server 100 without any particular operation by a user.

According to the above-described scan processing in this embodiment, it is possible for an administrator of the content server 100 to perform scanning of images by using the printer 400 regardless of a hardware environment and a software environment of the client 200 merely by providing the Web page PG2 (refer to FIG. 10), which is administrated by the administrator itself, with a user interface (the scan button B4) having a link to the mediation server 300. Therefore, the client 200 needs neither any printer (any scanner) connected thereto nor any scanner driver installed therein, thereby enabling reduction of loads on the client 200. As a result, any device capable of browsing Web pages can be applied as the client 200. Therefore, not only a personal computer, but also various electronics devices, such as a net book, a mobile terminal, a portable music player, a game machine, a television set, a video player, and a video recorder, can be applied as the client 200. Moreover, in this embodiment, it is possible for users to utilize the scanning function of the printer 400 merely by operating the user interfaces on the Web browser 205. Therefore, it is unnecessary for users to additionally execute application software and driver software needed to utilize the scanning function. Thus, it is possible for users to utilize scanners merely by performing extremely easy operations.

Moreover, according to the above-described scan processing, control of the printer 400, creation of preview images and the like are performed by the mediation server 300. Therefore, it is unnecessary for content providers to provide the content server 100 with any mechanism for controlling the scanning function of the printer 400. Thus, for example, it is possible for the content providers to easily incorporate a function of scanning images in their own Web pages without any consideration of scanning environments which are different for respective users.

Furthermore, according to the above-described scan processing, although printer serial numbers specific to the respective printers 400 are registered in the mediation server 300, the printer serial numbers are not notified to the content server 100. Therefore, it is unnecessary to directly notify the existence of the printers 400 to the content providers which are third parties. Thus, it is possible to provide a system having superiority in security.

In addition, in the above-described scan processing, finally, image data resulting from scanning images are stored in the content server 100, and this image data having been stored in such a manner is available in various types of usage. For example, it is possible to allow anyone to browse or download images corresponding to the image data stored in the content server 100 through the Web browser 205 of the client 200, or it is also possible to enable only administrators of the content server 100 to browse or download images corresponding to the image data stored in the content server 100. As a matter of course, it is also possible to, by restricting browsing or downloading, enable only those who have given permission in advance to browse or download images corresponding to the image data stored in the content server 100.

E. MODIFIED EXAMPLES

Hereinbefore, an embodiment of the invention has been described, but the invention is not limited to this embodiment. The invention can be variously configured within the scope not departing the gist of the invention. For example, in the above-described embodiment, the content outputting system 10 is capable of executing both the content output processing and the scan processing, but may be capable of executing any one of the content output processing and the scan processing. Besides, the following modifications and combinations thereof can be realized.

Modified Example 1

In the above-described embodiment, the content outputting system 10 outputs print contents included in the content server 100 by using the printer 400. In contrast thereto, the content outputting system 10 can also output print contents each being located at any URL designated by the client 200 or any print content (e.g., image data) stored in the client 200 by using the printer 400.

Figure 18:
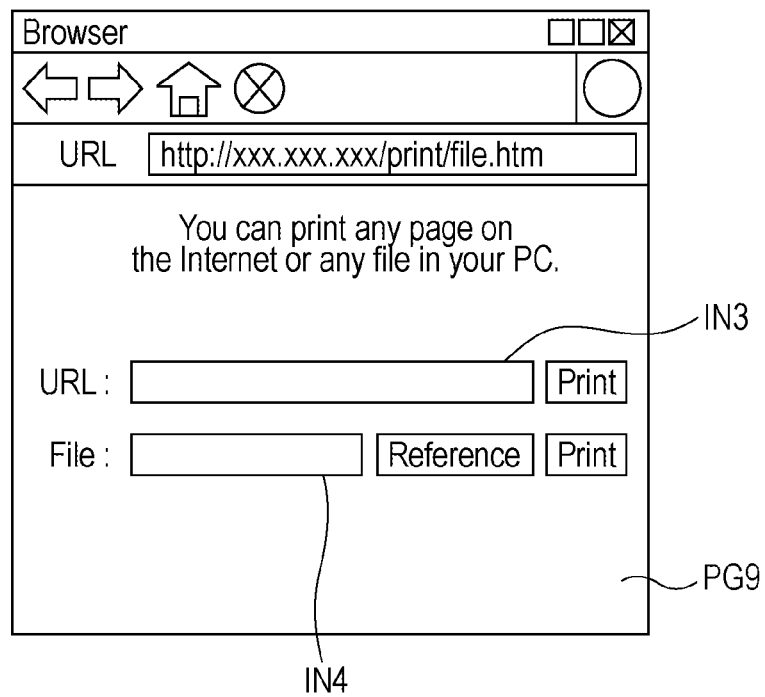
FIG. 18 is a diagram illustrating an example of a screen view of a page for designation of any print content, according to an embodiment of the invention.

Referring to FIG. 18 which is a diagram illustrating a page for designation of any print content in the modified example 1, a Web page PG9 is a page which is displayed by inputting a predetermined URL of the mediation server 300 to the Web browser 205, and which is provided therein with an input field IN3 for designating a URL, and an input field IN4 for designating a path in which a print content is stored. When a user pushes a print button subsequent to inputting of a URL to the input field IN3 or inputting of a path of a print content to the input field IN4, the inputted URL or a file of data corresponding to the print content is transmitted to the mediation server 300. In the case where the mediation server 300 has obtained the URL from the Web page PG9, by handling the obtained URL as a content URL obtained in step S210 of the above-described content output processing, the mediation server 300 can perform printing by executing processing just like the content output processing. Further, in the case where the mediation server 300 has obtained the file of data corresponding to the print content from the Web page PG9, by handling the obtained print content as a print content acquired in step S242 of the above-described content output processing, the mediation server 300 can perform printing by performing processing just like the content output processing.

Modified Example 2

In the above-described embodiment, the printer 400, which is a multifunction type printer composed of an integrated combination of a printer and a scanner, is used for printing and scanning, but the printer and the scanner may be separated. In this case, in the above-described printer registration processing, the printer and the scanner are independently registered into the printer database 312.

Modified Example 3

In the content output processing according to the above-described embodiment, an output destination of a target content is the printer 400. In contrast thereto, it is possible to output contents from various output devices, such as a projector and a television set. Further, in the above-described scan processing, images are inputted by using the scanning function included in a printer. In contrast thereto, it is possible to input images from various image input devices, such as a digital camera, a Web camera, a mobile phone, and a mobile terminal.

Modified Example 4

In the content output processing according to the above-described embodiment, in step S202, user authentication based on a user ID and a password thereof may be performed when the content server 100 receives a request for browse of a page from the client 200. This method enables achievement of a scheme in which only allowed users can perform printing. Moreover, on the basis of this user authentication, it is possible to specify users who have performed printing, and thereby, impose payments on the users who have performed printing in accordance with respective amounts of printing. Moreover, regarding the above-described scan processing, similarly, it is also possible to perform user authentication and impose payments on users.

Modified Example 5

In the above-described embodiment, operations for printing and scanning are received via the Web browser 205 installed in the client 200. In contrast thereto, such operations can be received through any device or program which is capable of performing communication based on the HTTP standard. For example, an application program (Widget) dedicated to printing of coupon tickets is installed into the client 200 (for example, a mobile phone) in advance, and through this application program, it is possible to receive operations for printing and scanning. In this case, a URL of the mediation server 300, a content URL, a post URL and a return URL may be set in the application program in advance. This method enables omission of steps S200 to S206 in the content output processing (FIG. 9) and steps S300 to S306 in the scan processing (FIG. 13).

Modified Example 6

In the content output processing and the scan processing according to the above-described embodiment, the client 200 is identified on the basis of cookie information stored in the Web browser 205 of the client 200. However, the use of the cookie information is not essential, and the client 200 may be identified on the basis of other information. For example, it is possible to identify clients on the basis of environment variables regarding the client 200, which are added to a HTTP based request message. The environment variables include information regarding a client, such as a type and a version of each of a Web browser and an operating system, an IP address, a host name, and a port number. Further, in the case where the client 200 is a mobile phone, a telephone number thereof can be also included in the environment variables.

Modified Example 7

In the content output processing and the scan processing according to the above-described embodiment, when a print button or a scan button is pushed on the Web browser 205 of the client 200, a printer selection page is necessarily provided by the mediation server 300 and is displayed. In contrast thereto, in the case where the number of printers a user has registered is only one, or in the case where, under a condition in which a printer having been assigned in advance is stored in a cookie, printer assignment information is notified to the mediation server 300 in response to pushing of a print button or a scan button, the mediation server 300 may cancel the provision of the printer selection page. This method enables realization of an immediate starting in printing or scanning without any provision of pages to the client 200 from the mediation server 300, when a print button or a scan button is pushed on a Web page (FIG. 10) provided by the content server 100. Thus, it is possible for users to perform printing and scanning more easily.

What is claimed is:

1. A content outputting method associated with four kinds of apparatuses which are connected to a network and communicate with one another via the network, the four kinds of apparatuses being a client, a content server including a storage section which stores blocks of content data at respective predetermined storage locations thereof, a mediation server and an outputting apparatus, the content outputting method comprising:

transmitting, by the content server, two kinds of information to the client, one kind thereof being information indicating a storage location of a certain one of the blocks of content data, the other one thereof being information indicating an address of the mediation server;

transmitting, by the client, upon reception of a command for outputting the certain one of the blocks of content data, a first request to the mediation server on the basis of the received information indicating the address of the mediation server, the first request being a request for outputting the certain one of the blocks of content data, the request including the information indicating the storage location of the certain one of the blocks of content data;

transmitting, by the mediation server, upon reception of the first request from the client, a second request to the content server, the second request being a request for acquisition of the certain one of the blocks of content data;

transmitting, by the content server, upon reception of the second request from the mediation server, first data to the mediation server, the first data being the certain one of the blocks of content data, which has been retrieved from the storage section of the content server;

transmitting, by the mediation server, upon reception of the first data from the content server, second data to the outputting apparatus, the second data being output data which has been created on the basis of the first data; and outputting, by the outputting apparatus, upon reception of the second data from the mediation server, a content corresponding to the received the second data, wherein the client, the content server, the mediation server and the outputting apparatus are different apparatuses from each other.

2. A content server which is one of four kinds of apparatuses, which are included in a content outputting system, and which communicate with one another via a network, the four kinds of apparatuses being a client, a mediation server, an outputting apparatus, and the content server, the content server comprising:

a storage section configured to store blocks of content data at respective predetermined storage locations thereof;

an information transmission section configured to transmit information indicating a storage location of one of the blocks of content data and information indicating an address of the mediation server to the client; and a content transmission section configured to, upon reception of a request for acquisition of one of the blocks of content data from the mediation server, retrieve the requested block of content data from the storage section, and transmit the retrieved block of content data to the mediation server from which the request for acquisition thereof has been received, wherein the client, content service, the mediation server, and the outputting apparatus are different apparatuses from each other.

3. A mediation server which is one of four kinds of apparatuses, which are included in a content outputting system, and which communicate with one another via a network, the four kinds of apparatuses being a client, a content server, an outputting apparatus, and the mediation sever, the mediation server comprising:

an acquisition request transmission section configured to, upon reception of a first request for outputting content data from the client, transmit a second request for acquisition of the content data to the content server;

a content reception section configured to receive the requested content data from the content server to which the second request has been transmitted; and an output data transmission section configured to create output data on the basis of the received content data, and transmit the resultant created output data to the outputting apparatus received, wherein the client, content service, the mediation server, and the outputting apparatus are different apparatuses from each other.

4. The mediation server according to claim 3, wherein the acquisition request transmission section is configured to transmit the second request by using a first address indicating a storage location of the content data, the first address being extracted from a second address which is included in the first request, and which is a combination of an address of the mediation server and the first address.

5. The mediation server according to claim 3,
wherein the acquisition request transmission section is configured to, in advance to transmission of the second request to the content server after having received the first request from the client, receive an outputting apparatus assignment with respect to outputting of the content data, from the client which is a sender of the first request, and
wherein the output data transmission section is configured to transmit the output data to the outputting apparatus having been assigned by the client which is a sender of the first request.

6. The mediation server according to claim 5, further comprising:
a database configured to include data indicating a correspondence relation between a serial number, which is assigned to the outputting apparatus when the outputting apparatus is manufactured, and an outputting apparatus identifier, which is uniquely assigned to the outputting apparatus by the mediation server,
wherein the acquisition request transmission section is configured to receive an outputting apparatus assignment using the outputting apparatus identifier from the client which is a sender of the first request, and
wherein the output data transmission section is configured to specify the outputting apparatus, which is a transmission destination of the output data, in accordance with a serial number which corresponds to the outputting apparatus identifier having being used in the received assignment.

7. The mediation server according to claim 3, wherein the acquisition request transmission section is configured to, after having received the first request from the client, which includes an address of the content server in addition to a storage location of the content data, transmit the address of the content server to the client which is a sender of the first request.

* * * * *